Patented June 9, 1931

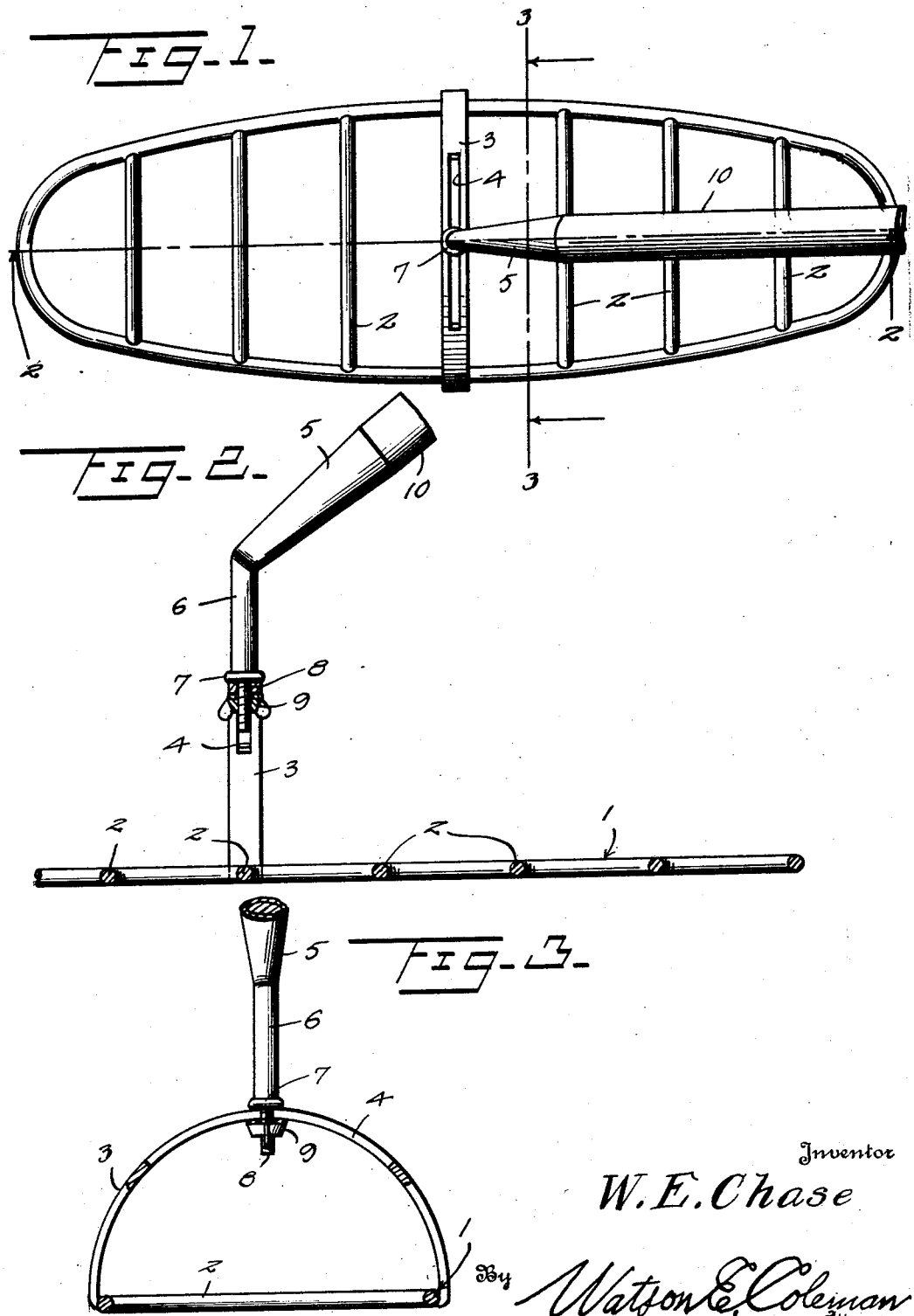

1,809,743

UNITED STATES PATENT OFFICE

WALTER E. CHASE, OF SARASOTA, FLORIDA

RUB HOE

Application filed January 4, 1930. Serial No. 418,568.

This invention relates to improvements in hoes and pertains particularly to a rub hoe.

The primary object of the present invention is to provide a hoe adapted for use in cultivated or mellow soil for rubbing out young weed growths between plants, cultivating and pulverizing the soil between the plants by forcing it up between certain bars of the hoe while rubbing out the young weed growths above referred to.

The device also serves to thoroughly mix recently applied fertilizer with the soil.

In the raising of plants such for example as celery, the soil is well cultivated and fertilized and it is in this type of soil that weeds develop and grow rapidly. At the present time the removal of these weeds is accomplished in certain locations by scratching them out with the hand, the process being called fingering, which process is slow and tedious. It sometimes occurs that the plants are set either a little too deep or a little shallow in the soil and when this is the case the present hoe in addition to being employed for rubbing out and destroying the weeds which at the present time are removed by hand, may be used to shift the soil about the plants in such a way that some thereof will be removed from about plants which are set too deep and those plants which are set too shallow may have the earth banked thereabout. Because of the provision of rounded surfaces of those parts of the hoe which would be likely to come into contact with the plants none of the living plants will be damaged or cut during the performance of these operations.

Another object of the invention is to provide a surface working hoe having a handle adjustably attached thereto whereby the operator may stand at one side of the row of plants between which the hoe is being worked and use the tool without difficulty.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a view in top plan of the rub hoe embodying the present invention.

Figure 2 is a sectional view taken on the line 2—2 of Figure 1.

Figure 3 is a transverse section taken on the line 3—3 of Figure 1.

Referring more particularly to the drawings the numeral 1 indicates generally the body of the rub hoe comprising the present invention which body as shown is in the form of an elliptical frame which is made of bar iron which may be of any cross-sectional design but is preferably circular so that no sharp edges will be formed which might injure plants coming into contact therewith.

Within this elliptical frame a plurality of cross bars 2 are transversely arranged which cross bars, when the frame is moved over the surface of the ground in a path parallel with its long axis, scrape up the soft earth and thus cut or rub down small weed plants with which they come in contact.

Intermediate its ends the frame 1 has secured thereto the arcuate bail 3 which is preferably formed of strap iron. This bail 3 is provided intermediate its ends with a slot 4. Attached to the bail 3 is a handle socket 5 which has extending from its lower end a post 6. The free end of this post is provided with an enlargement 7 which is adapted to position against the outer surface of the bail 3 and extending from the post is a threaded pin 8 which projects through the slot 4 in the bail and receives a thumb screw 9 which, when drawn up on the screw, holds the post rigidly against the outer surface of the bail in the manner shown.

The socket 5 extends from the post 6 in the manner shown and may be adjusted on the bail with the post to any desired angle, this socket receiving therein a wooden handle 10.

From the foregoing description it will be readily seen that with the post 6 at the central part of the bail 3 the handle 10 will extend upwardly at an angle from the hoe 1 so that the user thereof may operate the same directly ahead as for example when working betwen plants in a row. If the hoe 1 is to be worked along the side of a row the thumb screw 9 may be loosened and the post 6 slipped over to one side of the hoe on the bail so that the handle will be so disposed that the user of the hoe may stand at one side of the row of plants and conveniently operate the hoe while it is arranged off to one side.

With this tool small weeds may be readily rubbed out of the soil and the rounded frame of the hoe will not injure any of the plants of the crop in the event that the hoe comes into contact therewith.

Having thus described my invention, what I claim is:

1. A rub hoe of the character described, comprising a frame having spaced bars arranged transversely thereof, said frame and bars being of substantially the same thickness whereby contact thereof with the surface of the ground will be had, and a handle connected at one end intermediate the ends of the frame and extending upwardly at an angle therefrom.

2. A rub hoe of the character described, comprising an elliptical frame, cross bars disposed in the frame, a handle, and means for securing the handle to the frame substantially midway between its ends.

3. A rub hoe of the character described, comprising an elliptical frame, cross bars disposed in the frame, a handle, a bail secured across the frame intermediate its ends, and means for securing said handle to said bail.

In testimony whereof I hereunto affix my signature.

WALTER E. CHASE.